Figure 1:
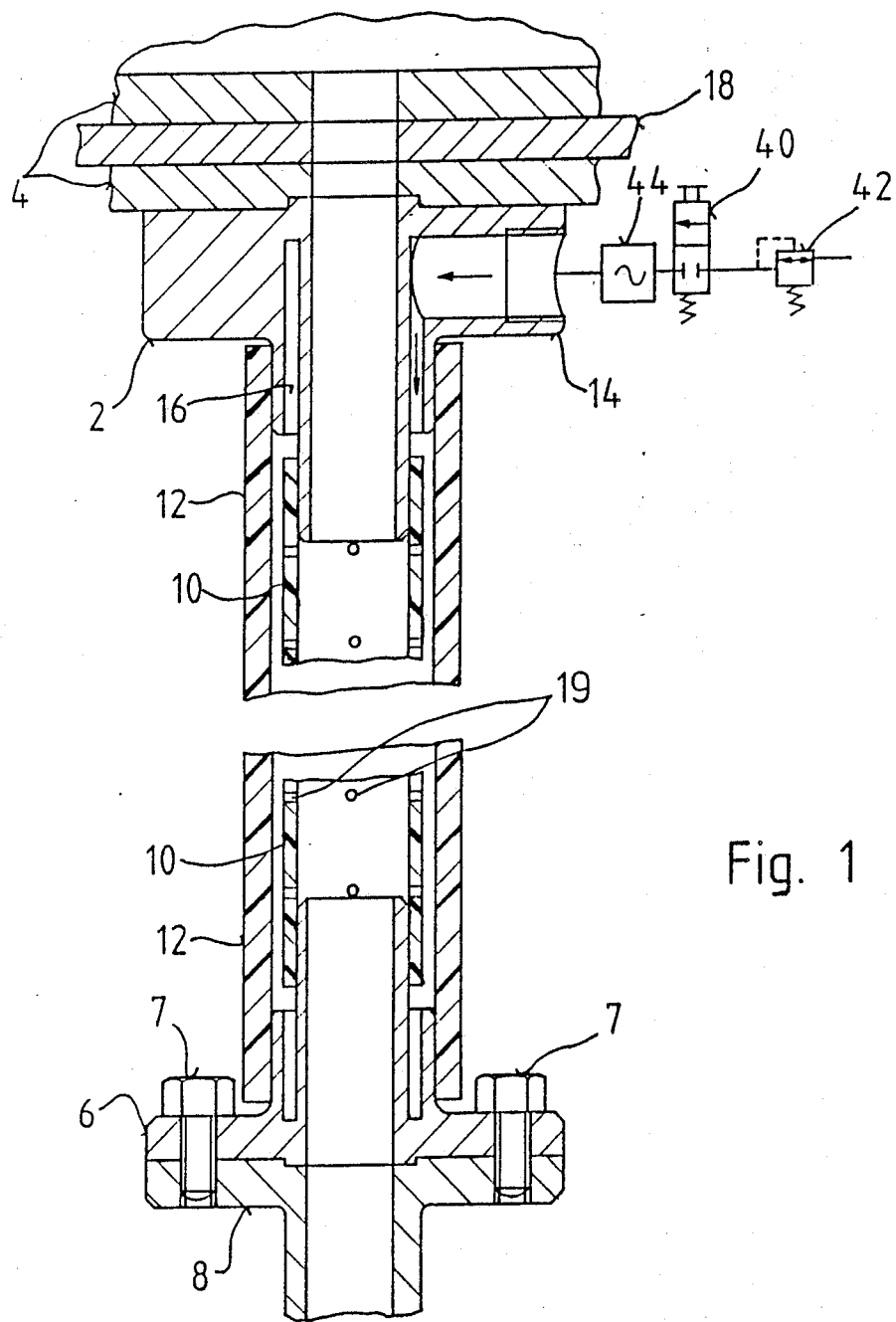

United States Patent [19]

Teubert

[11] Patent Number: 4,928,739

[45] Date of Patent: May 29, 1990

[54] MOLD FILLING METHOD AND TRANSPORT APPARATUS FOR BEAD-LIKE RESILIENT MATERIAL TRANSPORTED BY A FLUID

[76] Inventor: Joachim Teubert, 15 Waldshuter Strasse, 7712 Blumberg 1, Fed. Rep. of Germany

[21] Appl. No.: 37,968

[22] Filed: Apr. 14, 1987

[30] Foreign Application Priority Data

Apr. 21, 1986 [DE] Fed. Rep. of Germany ....... 3613380

[51] Int. Cl.⁵ ............................................. B65G 53/06
[52] U.S. Cl. .......................................... 141/5; 141/67; 406/95; 425/584
[58] Field of Search .................... 141/1, 5, 6, 67; 406/89, 93-95, 14, 86, 90, 91; 425/584, 449, 129.1, 120

[56] References Cited

U.S. PATENT DOCUMENTS

| | | | |
|---|---|---|---|
| 713,787 | 11/1902 | McKone | 406/95 |
| 3,028,625 | 4/1962 | Dawson | 425/584 |
| 3,099,045 | 7/1963 | Honkanen | 425/584 |
| 3,224,040 | 12/1965 | Bridges et al. | 425/584 |
| 3,375,309 | 3/1968 | Stevens | 425/584 |
| 3,726,954 | 4/1973 | Munk et al. | 141/67 |
| 4,082,366 | 4/1978 | Duff et al. | 406/76 |
| 4,116,491 | 9/1978 | Ply | 406/89 |
| 4,693,856 | 9/1987 | Rubens et al. | 264/45.4 |

FOREIGN PATENT DOCUMENTS 1169110 6/1984 Canada ................................. 406/95

*Primary Examiner*—Stephen Marcus
*Attorney, Agent, or Firm*—Keil & Weinkauf

[57] ABSTRACT

A method of filling a mold with resilient beads and transport apparatus for delivering the beads to the mold, wherein the beads are passed from a supply bunker to the mold via a transport line by a transport fluid, and wherein pressure in the transport line is equalized by feeding an additional fluid over the length of the line. The apparatus includes a bead-carrying pipeline or hose having sieve-like wall orifices which are connected to channels which run along the length of the pipe or hose. The orifices permit fluid exchange between the pipe or hose and the channels, which exchange serves to equalize the pressure within the pipe or tube and therefore prevent the pipe or tube from becoming blocked.

9 Claims, 2 Drawing Sheets

MOLD FILLING METHOD AND TRANSPORT APPARATUS FOR BEAD-LIKE RESILIENT MATERIAL TRANSPORTED BY A FLUID

The present invention relates to a method for filling a mold with bead-like resilient material by means of a transporting fluid, and to a transport apparatus for carrying out this method.

For transporting a bead-like material through a pipeline or hose by reduced pressure, it is known that the pipe or hose wall can be provided with isolated holes through which external air enters. In this way, the charge of transporting air stream can be adjusted or reduced in a path-dependent manner to avoid blockages. However, this measure is not suitable for transporting bead-like resilient material, for example polyolefin foam particles, because the material expands to a considerable extent and may therefore block the transport line. When resilient material is transported, it is desirable to use a transporting fluid under super-atmospheric pressure instead of reduced pressure. If a blockage occurs under these circumstances, the pressure gradient along the line becomes even steeper. Additionally, the resilient material usually lags behind the very suddenly released fluid stream, and therefore when a blockage does occur, it leads to a sudden pressure drop downstream which produces a sudden expansion of the resilient beads. A blockage produced in this manner is difficult to eliminate by pressure shocks or the like. Instead, to remove the blockage, the hose usually needs to be disconnected and cleared by mechanical means. The invention is intended to remedy this situation. This can easily lead to blockages in the transport line. Moreover, in order to shorten the process for filling machines which process such raw material, it is desirable, instead of reduced pressure, to use a transporting fluid under super-atmospheric pressure, with the result that the pressure gradient along the line becomes even steeper. Furthermore, the material lags behind the very suddenly released fluid stream, and a blockage, once it occurs, leads to an even more sudden pressure drop downstream, which as such produces a correspondingly sudden expansion. A blockage produced in this way can scarcely be eliminated even by pressure shocks or the like. Instead, to achieve this it is generally necessary to disconnect the hose and clear it by mechanical means. The invention is intended to remedy this situation.

It is an object of the present invention to provide a method for filling a mold with bead-like resilient material and a transport apparatus suitable for carrying out the method, which method and apparatus made it possible to avoid a blockage of the material being transported or at least to eliminate such a blockage immediately and in an extremely simple manner.

We have found that this object is achieved, according to the invention, by the measures described below.

The present invention thus relates to a method for filling a mold with bead-like resilient material which is fed from a bunker to the mold in a transport line by means of a transporting fluid, wherein pressure equilibration is effected in the transport line by feeding additional fluid over the length of the said line.

The present invention furthermore relates to a transport apparatus for bead-like resilient material transported by means of a fluid, having a pipeline and/or hose which is subjected to a pressure gradient effective in its longitudinal direction and whose interior is connected, via sieve-like wall orifices permitting exchange of fluid, to a space which is shielded from the transported material and consists of one or more channels running along the line.

The additional fluid which is introduced, or can be introduced, in this manner it possible, even in the case of an instantaneous blockage, to effect pressure equilibration along the transport line, by means of which equilibration expansion of the material can be counter-acted.

The novel method is used in the production of moldings by welding or adhesive bonding of bead-like resilient material which has closed cells and therefore change its volume when the pressure changes. Examples of suitable materials are foams, in particular those based on polyolefins, such as polyethylene, polypropylene and copolymers which contain more than 50% by weight of ethylene and/or propylene units. These foams generally have a density of from 0.010 to 0.200, in particular from 0.015 to 0.100, $g/cm^3$. They are generally in the form of spheres or granules and have a mean diameter of from 2 to 20 mm, preferably of from 3 to 15 mm, in particular from 5 to 12 mm.

The mold to be filled may be of any size and shape. The interior of the mold corresponds to the molding to be produced therein. As a rule, the molds used are ones which close to give a seal which is not gas-tight. Advantageously, the mold walls are perforated or porous so that hot air or steam can be introduced into the foaming space during the shaping process, and the fluid used, in general air, is allowed to escape during the filling process. During the filling process, the mold is either under atmospheric pressure or under a back pressure which is not less than 0.1, preferably from 0.2 to 0.8, bar below the inlet pressure of the transporting fluid. Such a back pressure can readily be set, for example, by a pressure control at the exit of a steam chamber surrounding the perforated mold. In the production of polyolefin foam moldings, the pressure in the mold during the filling process is as a rule so high that the particles occupy a 10–50% smaller volume than under atmospheric pressure. This ensures that, during heating and subsequent pressure relief, the particles weld together in the mold to form a substantially homogeneous molding.

The bead-like material is fed from a bunker to the mold in a pipeline or hose by means of a transporting fluid, in general a gas which is inert to the material, in particular air or nitrogen. The inlet pressure of the transporting fluid is usually from 1.2 to 10, preferably from 1.5 to 8, in particular from 2 to 5, bar.

The transport line should have an internal diameter of not less than 2 d, preferably from 3 d to 10 d, d being the mean diameter of the material to be transported.

Embodiments of the claimed transport apparatus are described below with reference to the drawings. In the drawings, FIG. 1 shows a longitudinal section of a first embodiment, FIG. 2 shows a longitudinal section of a second embodiment and FIG. 3 shows a cross-section through the relevant line in a third embodiment.

The transport apparatus shown in FIG. 1 essentially consists of a first pipe connection 2 at the base 4 of a bunker which holds the relevant material, e.g. polyolefin foam raw material, and is under air pressure, a second pipe connection 6 which is connected, via screws 7, to the connection 8 of a filling apparatus of a machine which processes the material to shaped articles, and a first perforated hose 10 which connects the two pipe connections 2 and 6 to one another and transports the material, and a second hose 12 which surrounds this first hose with play and is likewise connected, with a tight seal, to the two pipe connections 2 and 6. The first pipe connection 2 possesses a lateral connection 14 which is such that compressed air can be fed to the interior of the second hose 12 via an annular channel 16, while the other end of the hose 12 is closed by the second pipe connection 6. The compressed air fed into the hose 12 is capable of passing through the perforation holes 19 in hose 10 and into the latter, where it effects pressure equilibration in spite of any blockage which may occur.

The base 4 of the bunker possesses, for example, a rotatable slide plate 18, by means of which admission of the material and of the air constituting the transporting fluid into the hose 10 can be controlled. Whereas the hose 12 has to withstand the pressure of the compressed air, the hose 10 can be relatively thin. It may even be advisable deliberately to choose a flexible hose so that, depending on the compressed air feed through the connection 14 and/or from the bunker, it undergoes contractions and expansions. If necessary, the compressed air can be fed in controlled pulses through the connection 14.

Figure 2:
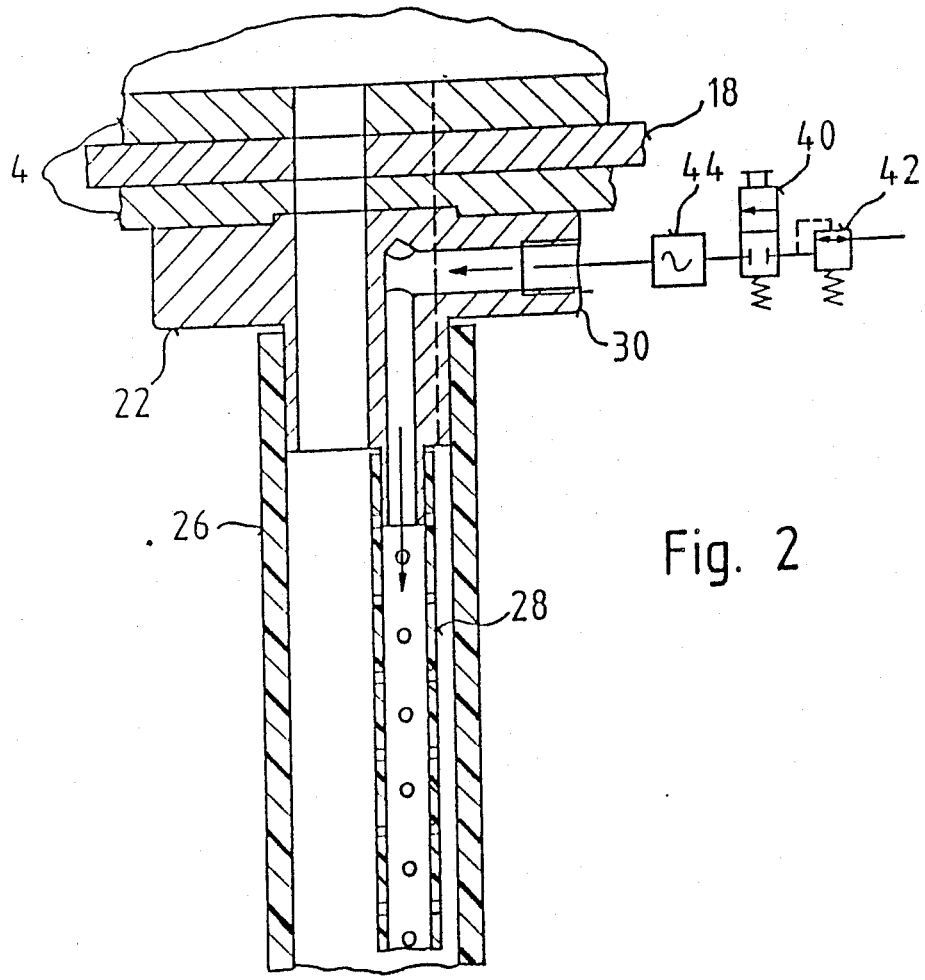
Figure 3:
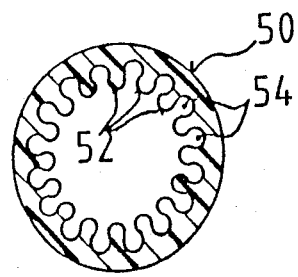

The transport apparatus shown in FIG. 2 differs from that in FIG. 1 essentially in that a compressed air feed from the outside to the inside of the hose transporting the material to be conveyed is replaced by an inner feed. For this purpose, the relevant transport apparatus has a first pipe connection 22 at the base 4 of the bunker holding the material, a second pipe connection (not shown here) on the filling apparatus of the processing machine, a first hose 26 which carries the material and, inside this first hose, a substantially thinner perforated second hose 28. While the second hose 28 is once again closed at the second connection, it is capable of being fed with compressed air at the pipe connection 22, through a lateral connection 30, as is the case in the first example with connection 14, in order likewise to effect pressure equilibration in this way in the material-transporting hose over its entire length, and moreover to change, if necessary, the internal cross-section within the hose 26.

As both figures likewise show, the compressed air can bed fed to the lateral connection 14 or 30 via a solenoid valve 40 in series with a reducing valve 42. The reducing valve 42 issued to set the pressure so that it is equal to or greater than that under which the material is transported from the bunker through the first pipe connection 2 or 22. The compressed air may be fed under a pressure which is 0.05-2 bar higher than that of the transporting fluid. The solenoid valve 40 can be actuated either as required, in the event of a blockage, or automatically in conjunction with each filling process. By means of a vibrator 44 installed in the same compressed air line, as likewise shown in the figures, it is possible to achieve a pulsed compressed air feed.

The cross-section shown in FIG. 3 illustrates how, in another embodiment, two hoses can be replaced by a single hose. In this case, this signal hose 50 possesses, in its inner wall, longitudinal folds 52 all around, between which there is an appropriate number of channels 54. The spacing of the folds 52, at least in the region of their crests, is so small that the bead-like material transported inside the hose 50 cannot enter the channels 54, and the latter are thus kept free for pressure equilibration.

If necessary, the channels 54, too, can be connected, by a suitable means, to their own compressed air or fluid feed, similarly to the connections 14 and 30 of the examples described above. On the other hand, it is often sufficient, here as in the other examples, to allow pressure equilibration to take place merely through the appropriate channels themselves, so that a separate fluid feed is unnecessary.

In addition, it is of course also possible, where desired, for all hoses described above to be replaced by appropriately shaped pipes. If necessary, the gaseous fluid may be replaced by a liquid one or the like. Where the channels have their own fluid feed, the fluid in question is of course in general of the same type as that used for transporting.

We claim:

1. A method for filling a mold with resilient beads which comprises:
    passing the resilient beads from a bunker to the mold through a transport tube by means of a transporting fluid;
    passing a second fluid, having a pressure equal to or greater than the pressure of the transporting fluid, through one or more channels which are operatively connected to the transport tube by means or orifices in the wall of the tube, whereby an interchange of fluid takes place and the pressure within the tube is equalized so that expansion of the resilient beads and blockage of the tube is prevented.

2. The method of claim 1, wherein the resilient material is a foam having a particle size of from 2 to 20 mm.

3. The method of claim 1, wherein the transporting fluid has an inlet pressure from 1.2 to 10 bar.

4. The method of claim 3, wherein the inlet pressure of the transporting fluid is from 1.5 to 8 bar.

5. The method of claim 4, wherein the inlet pressure of the transporting fluid is from 2 to 5 bar.

6. The method of claim 1, wherein the second fluid is fed under a pressure which is 0.05-2 bar higher than that of the transporting fluid.

7. The process of claim 1, wherein compressed air is used as the transporting fluid and as the second fluid.

8. The method of claim 1, wherein the transport tube has an internal diameter of not less than 2 d, where d is the mean diameter of the resilient beads.

9. The method of claim 8, wherein the internal diameter is from 3 d to 10 d.

* * * * *

UNITED STATES PATENT AND TRADEMARK OFFICE
CERTIFICATE OF CORRECTION

PATENT NO. : 4,928,739

DATED : May 29, 1990

INVENTOR(S) : Joachim Teubert

It is certified that error appears in the above-identified patent and that said Letters Patent is hereby corrected as shown below:

Claim 1, Line 9, col. 4,

"or" should read --of--

Signed and Sealed this

Twentieth Day of August, 1991

*Attest:*

HARRY F. MANBECK, JR.

*Attesting Officer*  *Commissioner of Patents and Trademarks*